United States Patent
Guo et al.

(10) Patent No.: US 12,043,727 B2
(45) Date of Patent: *Jul. 23, 2024

(54) POLYMER COMPOSITION, ARTICLE COMPRISING SAID COMPOSITION AND USE OF SAID ARTICLE

(71) Applicant: SABIC GLOBAL TECHNOLOGIES B.V., Bergen op Zoom (NL)

(72) Inventors: Jing Guo, Geleen (NL); Sarah Van Mierloo, Geleen (NL); Chunfa Li, Geleen (NL); Ji Zhou, Geleen (NL); Chaodong Jiang, Geleen (NL); Christelle Marie Hélène Grein, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 555 days.

This patent is subject to a terminal disclaimer.

(21) Appl. No.: 17/416,118

(22) PCT Filed: Dec. 19, 2019

(86) PCT No.: PCT/EP2019/086410
§ 371 (c)(1),
(2) Date: Jun. 18, 2021

(87) PCT Pub. No.: WO2020/127801
PCT Pub. Date: Jun. 25, 2020

(65) Prior Publication Data
US 2022/0073717 A1    Mar. 10, 2022

(51) Int. Cl.
*C08L 23/12* (2006.01)
*C08K 5/372* (2006.01)
*H01Q 1/42* (2006.01)

(52) U.S. Cl.
CPC ............... *C08L 23/12* (2013.01); *H01Q 1/42* (2013.01); *C08K 5/372* (2013.01); *C08L 2201/08* (2013.01); *C08L 2205/025* (2013.01); *C08L 2207/02* (2013.01)

(58) Field of Classification Search
None
See application file for complete search history.

(56) References Cited

U.S. PATENT DOCUMENTS

| | | | |
|---|---|---|---|
| 5,081,170 A * | 1/1992 | Yagi | C08K 5/098 524/304 |
| 5,124,456 A | 6/1992 | Carette et al. | |
| 7,291,669 B2 | 11/2007 | Botkin et al. | |
| 10,214,627 B2 * | 2/2019 | Van Mierloo | C08L 23/12 |
| 2010/0286310 A1 | 11/2010 | Lederer et al. | |
| 2011/0076905 A1 | 3/2011 | Mussig et al. | |
| 2015/0315465 A1 | 11/2015 | Gupta et al. | |
| 2017/0088689 A1 * | 3/2017 | Van Mierloo | C08K 5/37 |
| 2022/0098394 A1 | 3/2022 | Jing et al. | |

FOREIGN PATENT DOCUMENTS

| | | |
|---|---|---|
| CN | 1580115 A | 2/2005 |
| CN | 102336969 A | 2/2012 |
| CN | 107312242 A | 11/2017 |
| EP | 1088871 A1 | 4/2001 |
| JP | 2001284959 A | 10/2001 |
| KR | 101339092 B2 | 12/2013 |

OTHER PUBLICATIONS

Kisuma Chemicals data sheet for DHT-4A. Retrieved from www.advanced-polymer.com. Archived on Internet Archive on Oct. 30, 2013. (Year: 2013).*
International Search Report for International Application No. PCT/EP2019/086410, International Filing Date, Dec. 19, 2019, Date of Mailing Feb. 18, 2020, 5 pages.
Written Opinion for International Application No. PCT/EP2019/086410, International Filing Date, Dec. 19, 2019, Date of Mailing Feb. 18, 2020, 5 pages.
Allen et al., "Interactions of antioxidants with hindered piperidine compounds in the thermal and photochemical oxidation of polypropylene fime." Plastics and Rubber Processing and Applications; 1985;5:259-265.
Kikkawa et al., "Antagonism Between Hindered Amine Light Stabilizers and Sulfur-containing Compounds" Polymer Degraduation and Stability;1987;18:237-245.
Kikkawa, "New Development in Polymer Photostabilization" Polymer Degraduation and Stability; 1995;49:135-143.
Malatesta et al., "High Heat and UV-Stabilization of Polyolefins under demanding conditions." Addcon World, the 11th International Plastics Additives and Modifiers Conference, Hamburg;2005.

* cited by examiner

*Primary Examiner* — Richard A Huhn
(74) *Attorney, Agent, or Firm* — CANTOR COLBURN LLP

(57) ABSTRACT

The present invention relates to a polymer composition, comprising a polypropylene and a stabilizing additive mixture, wherein said stabilizing additive mixture comprises: i) a thioether compound according to Formula I, ii) a Hindered Amine Light Stabilizer (HALS) comprising a substituted amine group; and iii) an inorganic acid scavenger. The present invention further relates to an article comprising said polymer composition, and the use of said polymer composition for the housing for antennas for wireless communication.

21 Claims, No Drawings

POLYMER COMPOSITION, ARTICLE COMPRISING SAID COMPOSITION AND USE OF SAID ARTICLE

CROSS REFERENCE TO RELATED APPLICATIONS

This application is a National Stage application of PCT/EP2019/086410, filed Dec. 19, 2019, which claims the benefit of China Application No. 201811557188.4, filed Dec. 19, 2018, both of which are incorporated by reference in their entirety herein.

TECHNICAL FIELD

The present invention relates to a polymer composition comprising a polypropylene and a stabilizing additive mixture. The present invention further relates to an article comprising such a polymer composition, and the use of such a polymer composition for the housing for antennas for wireless communication.

BACKGROUND

Plastic housings for telecom communication antennas are known. There are several severe requirements to which the polymer compositions have to comply in order to be suitable for use in antenna housing, such as a high temperature resistance, good ultraviolet absorption resistance, good ageing resistance, good shock resistance, good insulating capacity, good crazing resistance, good corrosion resistance, and high mechanical and dimensional strength. These antenna housings may be located in a severe environment and should resist deformation and deterioration.

SUMMARY

It is an object of the present invention to provide a polymer composition with improved resistance to heat and weathering.

It is a further object of the present invention to provide an article with improved resistance to heat and weathering.

Corresponding embodiments are also applicable for the article and the use of an article according to the present invention.

One or more of these objects are achieved by a polymer composition, comprising a polypropylene and a stabilizing additive mixture, wherein said stabilizing additive mixture comprises:
i) a thioether compound according to Formula I:

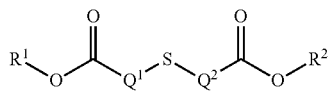

Formula I wherein $Q^1$ and $Q^2$ are each independently an alkyl spacer having between 1 and 6 carbon atoms, preferably being —$CH_2CH_2$—; $R^1$ and $R^2$ each independently being an alkyl group having between 14 and 26 carbon atoms, preferably between 16 and 20 carbon atoms, such as —$C_{18}H_{37}$; O being oxygen and S being sulphur;
ii) a Hindered Amine Light Stabilizer (HALS) comprising a substituted amine group; and
iii) an inorganic acid scavenger.

A "substituted amine group" as used in the present description means a group comprising a nitrogen atom that is substituted with other atoms than hydrogen. In other words, no —N(—H)— group. In an embodiment, the substituted amine group is an —N(—OR)— group or an —N(—R)— group wherein R is not a hydrogen.

It was surprisingly found that this above composition provides polymer products with improved heat resistance as well as weatherability and good dimensional and mechanical properties.

The invention further relates to an article comprising such a polymer composition, and to the use of such a polymer composition for the housing for antennas for wireless communication.

DESCRIPTION OF EMBODIMENTS

In an embodiment of the present invention, the polypropylene is a heterophasic propylene copolymer consisting of a propylene-based matrix and a dispersed ethylene-α-olefin copolymer. In a specific embodiment, the heterophasic propylene copolymer has a melt flow rate of between 0.1 and 10.0 g/10 min as determined in accordance with ISO 1133:1-2011 (230° C., 2.16 kg). In a specific embodiment the heterophasic copolymer comprises between 70 and 90 wt % of said matrix and between and 30 wt. % of said dispersed phase.

In an embodiment, $Q^1$ and $Q^2$ are each —$CH_2CH_2$—; $R^1$ and $R^2$ each —$C_{18}H_{37}$. This is a dialkyl ester of thiodipropionic acid, with CAS no: 693-36-7, and it is commercially available for instance under the name Irganox PS 802 FL from BASF.

In an embodiment, the substituted amine group in the HALS is a —N(R)— group; wherein R is a hydrocarbyl group. In a specific embodiment, the HALS is according to Formula IIa or IIb

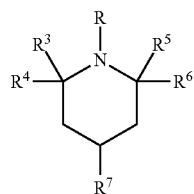

Formula IIa

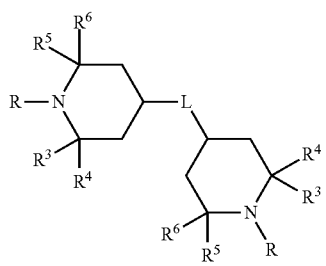

Formula IIb wherein:
$R^3$, $R^4$, $R^5$ and $R^6$ are each independently an alkyl ground having 1-3 carbon atoms;
$R^7$ is —O—C(=O)—$R^9$;
L is —O—C(=O)—$R^{10}$—C(=O)O—

R is either directly linked to the nitrogen atom (—$R^8$) or connected via an oxygen atom (—$OR^8$);

$R^8$ is an optionally substituted, optionally branched alkyl group having between 2 and 10 carbon atoms, such as between 3 and 5 carbon atoms;

$R^9$ is an alkyl group having between 4 and 14 carbon atoms;

$R^{10}$ is an alkyl group having between 4 and 14 carbon atoms.

In a further embodiment, in Formula Ia or IIb, $R^3=R^4=R^5=R^6$=methyl. In a further embodiment, in in Formula IIa or IIb, $R^8$ is a branched alcohol group.

In a preferred embodiment, the HALS is a NOR-type hindered amine light stabilizer wherein the HALS is according to Formula IIa or IIb, wherein R is connected via an oxygen atom (—$OR^8$); $R^8$ is an optionally substituted, optionally branched alkyl group having between 2 and 10 carbon atoms, such as between 3 and 5 carbon atoms. It was surprisingly found a polymer composition comprising a NOR-type HALS has improved heat resistance and weatherability. For example, the NOR-type HALS has the following structure:

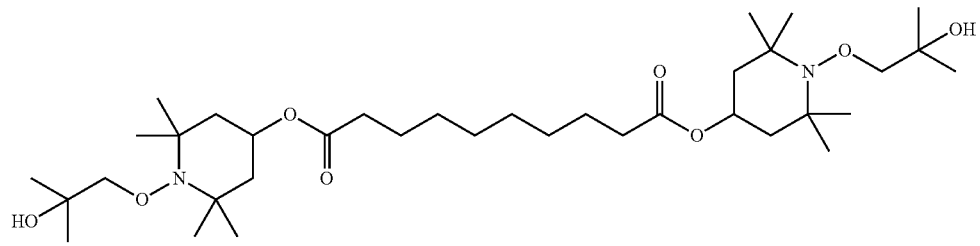 [SMILES: CC(C)(O)CON1C(C)(C)CC(OC(=O)CCCCCCCCC(=O)OC2CC(C)(C)N(OCC(C)(C)O)C(C)(C)C2)CC1(C)C]

NOR-type HALS is commercially available, for instance, Tinuvin® XT 855 FF from BASF.

In an embodiment, the inorganic acid scavenger is a hydrotalcite. In a preferred embodiment, this hydrotalcite is of the chemical family of aluminium-magnesium-carbonate-hydroxide (hydrate), with the following formula: $Mg_4 \cdot 3Al_2(OH)_{12} \cdot 6CO_3 \cdot mH_2O$. This compound has CAS no. 11097-59-9, and is commercially available for instance as Hycite® 713 of Clariant.

In an embodiment, the composition further comprises a sterically hindered phenolic antioxidant. In a preferred embodiment this sterically hindered phenolic antioxidant is a polyphenolic antioxidant. In a preferred embodiment this polyphenolic antioxidant is tetrakis(3-(3,5-di-tert-butyl-4-hydroxyphenyl)propionate), and is commercially available for instance as Irganox® 1010 from BASF.

In an embodiment, the composition further comprises a phosphite (secondary) antioxidant. In a preferred embodiment, this phosphite antioxidant is bis-t-butyl phenyl phosphite; and is commercially available for instance as Irgafos 168 from BASF.

In an embodiment, the thioether compound is present in an amount of between 0.10 and 1.0 wt. % of the total polymer composition. In a preferred embodiment the thioether compound is present in an amount of between 0.30 and 0.60 wt. % of the total polymer composition.

In an embodiment, the Hindered Amine Light Stabilizer is present in an amount of between 0.05 and 0.75 wt. % of the total polymer composition. In a preferred embodiment, the Hindered Amine Light Stabilizer is present in an amount of between 0.15 and 0.40 wt. % of the total polymer composition.

In an embodiment, the inorganic acid scavenger compound is present in an amount of between 0.05 and 0.75 wt. % of the total polymer composition. In an preferred embodiment, the inorganic acid scavenger compound is present in an amount of between 0.10 and 0.40 wt. % of the total polymer composition.

In an embodiment, the composition further comprises short glass fibre. In a preferred embodiment, the short glass fibre is present in an amount of between 15 and 50 wt. % of the total polymer composition, preferably at least 25 wt. %, more preferably at least 28 wt. %, preferably at most 35 wt. %, more preferably at most 32 wt. %; such as between 25 and 35 wt. % or between 28 and 32 wt. %.

In an embodiment, the article according to the invention is an outdoor article. In a preferred embodiment, the article is a housing for an antenna for wireless communication.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The scope of the present invention is defined by the appended claims. One or more of the objects of the invention are achieved by the appended claims.

EXAMPLES

The present invention is further elucidated based on the Examples below which are illustrative only and not considered limiting to the present invention.

Methods

The composition in prepared by compounding in a twin screw extruder as pellets, then testing sample preparation is done by single screw extrusion using the prepared pellets.

Chalking grade is determined according to ISO4892-2, after 1000 hr weathering. The chalking grade is expressed in a number between 0 and 5, using the following definition: 0=unchanged, 1=very slight change, 2=slight change, 3=moderate change, 4=considerable change, 5=severe change.

The notched Izod impact strength is determined according to ISO 180 at 23° C. Retention of the notched Izod impact strength is determined as the percentage of impact strength remaining after 1950 h at 150° C.

Materials

All (comparative) examples comprise a polypropylene impact copolymer (PP-I1), being Yungsox 3003 of *Formosa* (CAS no. 9010-79-1), having a melt index of 0.35 g/10 min (determined according to ISO 1133:1-2011). This impact copolymer comprises 15.7 wt. % of dispersed phase. The total amount of ethylene-based units (C2) in the copolymer (TC2) is 8.3 wt. %. The amount of ethylene-based units (C2) in the dispersed phase (RCC2) is 52.9 wt. %

All (comparative) examples comprise a high stiffness impact copolymer (PP-12), being Moplen EP5079 of LyondellBasell, with a melt flow rate (at 230° C., 2.16 kg) of 0.5 g/10 min. (determined according to ASTM D1238-13). This impact copolymer comprises 13.5 wt. % of dispersed phase. The total amount of ethylene-based units (C2) in the copolymer (TC2) is 5.8 wt. %. The amount of ethylene-based units (C2) in the dispersed phase (RCC2) is 43.0 wt. %

Comparative Example 5 comprises a high molecular weight N—H type (NH HALS 1) hindered amine light stabilizer, being Chimassorb2020 of BASF, with CAS no. 192268-64-7, with a molecular weight of 2,600-3,4 g/mol, a melting range of 120-150° C., a volatility (determined with thermogravimetric analysis, in air at 20° C./min) expressed as the temperature at 1% weight loss of 290° C. and expressed as the temperature at 10% weight loss of 355° C. The structural formula of this HALS is as follows.

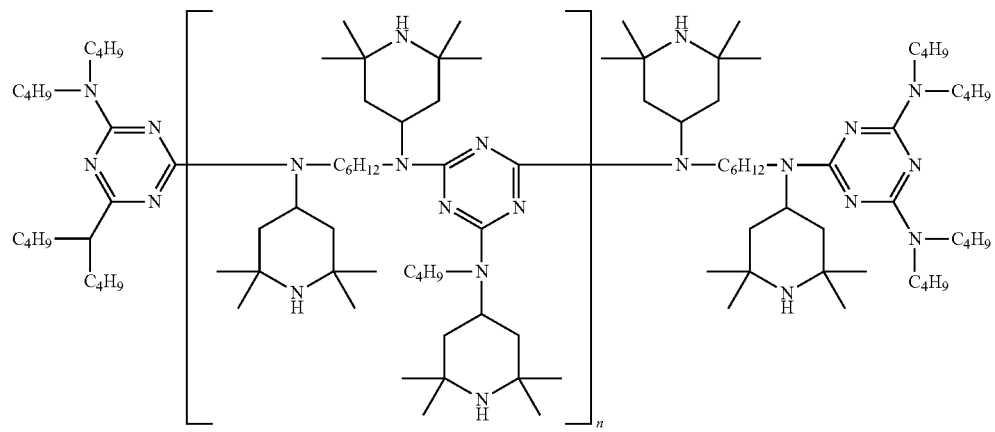

All (comparative) examples comprise an ethylene octene copolymer as a toughening agent (TA), being Fortify C1055D of SABIC, with a melt flow rate (at 230° C., 2.16 kg) of 2.2 g/10 min (at 190° C., 2.16 kg) or 1.0 g/10 min (determined according to ASTM D1238-13), a density of 857 kg/m$^3$ (ASTM D792-10(2015)) (determined according to ASTM D1238-13).

All (comparative) examples comprise a maleic anhydride modified homo polypropylene resin as compatibilizer (CP), being Bondyram 1010 by Polyram, with a melt flow rate (at 190° C., 2.16 kg) of 200 g/10 min (determined according to ISO1133:1-2011), a density of 0.90 g/cm3 (determined according to ISO1183), a melting point of 160° C. (determined with DSC), and a maleic anhydride concentration of 1.0% (determined with FTIR).

All (comparative) examples comprise a color master batch (CMB) with light grey color.

All (comparative) examples comprise short glass fiber (SGF) with CAS No. 65997-17-3 with sizing on surface to improve the compatibility of the short glass fiber and polypropylene. The short glass fiber has a diameter of 10 µm and a length of 4 mm. It is available from Owens Corning (OVC™ Reinforcements) under the name Performax 249A-10C.

All (comparative) examples comprise a polyphenolic antioxidant (Phen.AO), being Irganox® 1010 (pentaerythritol tetrakis(3-(3,5-di-tert-butyl-4-hydroxyphenyl) propionate)) available from BASF.

All (comparative) examples comprise a phosphite antioxidant (Phos.AO), being Irgafos® 168 (bis-t-butyl phenyl phosphite) available from BASF.

(Comparative) Examples 1, 5-8 comprise a thiosynergistic heat stabilizer, being Irganox® PS 802 FL by BASF (thioether). It is a dialkyl ester of thiodipropionic acid, with CAS no: 693-36-7.

(Comparative) Examples 1-4, 7-8 comprise a NOR-type (NOR HALS) hindered amine light stabilizer Tinuvin® XT 855 FF from BASF.

Comparative Example 6 comprises a mixture with its main component is low molecular weight N—H type HALS (NH HALS 2), further comprising a UV-absorber, the mixture being V703 by Cytec, with melting range 51-60° C., a relative density of 1.160 (25° C.) and a UV absorber wavelength range of 270-340 nm.

Comparative Examples 1-6 comprise an inorganic acid scavenger (Inorg.AS), being Hycite® 713 of Clariant, with CAS number: 11097-59-9 of the chemical family of aluminium-magnesium-carbonate-hydroxide (hydrate), with a molar ratio of MgO to Al$_2$O$_3$ of between 4 and 5. Comparative Example 7 comprises an organic acid scavenger (Org.AS), being calcium stearate.

All (comparative) examples comprise a high performance nucleating agent (NA) for polyolefins, being Hyperform HPN-68L of Milliken. All (comparative) examples comprise a fluoropolymer based processing additive (PA1), being Fluoro-polymer PPA2300 of Purvan, with a particle size of 25 mesh, bulk density of 0.72 g/cm$^3$, a melting point of 60° C., a volatile percentage (105° C., 1 h) of 0.12%.

All (comparative) examples comprise a mold release agent (MR), being N,N'-ethylene bis stearamide, commercially available as Kenamide EBS of PMC biogenix or Crodamide ORV of Sichuan SIPO Chemical or Acrawax C of Lonza, with CAS No. 110-30-5. Typical properties of this compound are a flash point (COC) of 296° C. and a fire point of 315° C.

All (comparative) examples comprise as processing additive (PA2) an ultra-high molecular weight siloxane polymer, dispersed in polypropylene homopolymer, being MB50-001 Masterbatch of Dow Corning, with a siloxane content of 50%, further comprising an organic resin polypropylene. This compound improves the surface quality, such as smoothness and gloss.

The composition of all (comparative) examples is indicated in Table 1 below in wt. %.

|         | Ex1   | CE2   | CE3   | CE4   | CE5   | CE6   | CE7   | CE8   |
|---------|-------|-------|-------|-------|-------|-------|-------|-------|
| PP-I1   | 25.80 | 25.80 | 25.80 | 25.80 | 25.80 | 25.80 | 25.80 | 25.90 |
| PP-I2   | 25.80 | 26.00 | 25.75 | 25.50 | 25.80 | 25.80 | 25.80 | 25.90 |
| TA      | 7.00  | 7.00  | 7.00  | 7.00  | 7.00  | 7.00  | 7.00  | 7.00  |
| CP      | 3.00  | 3.00  | 3.00  | 3.00  | 3.00  | 3.00  | 3.00  | 3.00  |
| CMB     | 3.00  | 3.00  | 3.00  | 3.00  | 3.00  | 3.00  | 3.00  | 3.00  |
| SGF     | 32.00 | 32.00 | 32.00 | 32.00 | 32.00 | 32.00 | 32.00 | 32.00 |
| Phen. AO| 0.30  | 0.50  | 0.75  | 1.00  | 0.30  | 0.30  | 0.30  | 0.30  |
| Phos.AO | 0.30  | 0.30  | 0.30  | 0.30  | 0.30  | 0.30  | 0.30  | 0.30  |
| Thioether| 0.40 | n.p.  | n.p.  | n.p.  | 0.40  | 0.40  | 0.40  | 0.40  |
| N-OR HALS| 0.30 | 0.30  | 0.30  | 0.30  | n.p.  | n.p.  | 0.30  | 0.30  |
| N-H HALS1| n.p. | n.p.  | n.p.  | n.p.  | 0.30  | n.p.  | n.p.  | n.p.  |
| NH-HALS2| n.p.  | n.p.  | n.p.  | n.p.  | n.p.  | 0.30  | n.p.  | n.p.  |
| Inorg. AS| 0.20 | 0.20  | 0.20  | 0.20  | 0.20  | 0.20  | n.p.  | n.p.  |
| Org. AS | n.p.  | n.p.  | n.p.  | n.p.  | n.p.  | n.p.  | 0.20  | n.p.  |
| NA      | 0.15  | 0.15  | 0.15  | 0.15  | 0.15  | 0.15  | 0.15  | 0.15  |
| PA1     | 0.20  | 0.20  | 0.20  | 0.20  | 0.20  | 0.20  | 0.20  | 0.20  |
| MR      | 0.55  | 0.55  | 0.55  | 0.55  | 0.55  | 0.55  | 0.55  | 0.55  |
| PA2     | 1.00  | 1.00  | 1.00  | 1.00  | 1.00  | 1.00  | 1.00  | 1.00  | n.p = not present

The retention of notched Izod impact strength, as well as the chalking grade are indicated below for all (comparative) examples.

|               | Ex1  | CE2  | CE3  | CE4  | CE5  | CE6  | CE7  | CE8  |
|---------------|------|------|------|------|------|------|------|------|
| Retention (%) | 80.8 | 51.5 | 52.6 | 64.2 | 78.5 | 75.7 | 72.5 | 86.9 |
| Chalking grade| 0    | 0    | 0    | 0    | 3    | 3    | 3    | 2    |

By comparing Ex1 with CE2, CE3 and CE4, it becomes clear that the addition of a thioether compound according to Formula I leads to improved retention.

By comparing Ex1 with CE5 and CE6, it becomes clear that the presence of a NOR type HALS leads to improved retention and chalking grade compared to an NH type HALS.

By comparing Ex1 with CE7 and CE8, it becomes clear that the presence of an inorganic acid scavenger leads to an improved retention and chalking grade compared to an organic or no acid scavenger.

The invention claimed is:

1. A polymer composition, comprising a polypropylene and a stabilizing additive mixture, wherein said stabilizing additive mixture comprises:

i) a thioether compound according to Formula I:

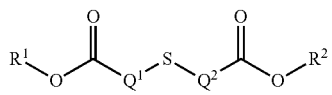

Formula I wherein $Q^1$ and $Q^2$ are each independently an alkyl spacer having between 1 and 6 carbon atoms; $R^1$ and $R^2$ each independently being an alkyl group having between 14 and 26 carbon atoms; O being oxygen and S being sulphur;

ii) a Hindered Amine Light Stabilizer comprising a substituted amine group; and iii) an inorganic acid scavenger, wherein the Hindered Amine Light Stabilizer has a structure represented by Formula IIa or IIb

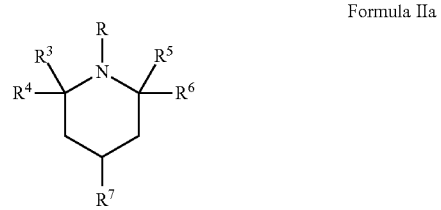

Formula IIa

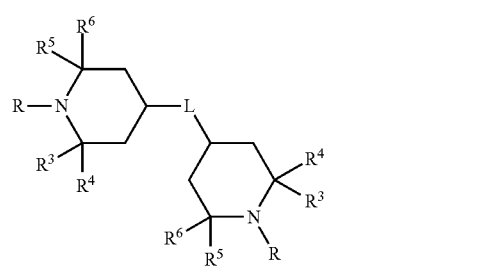

Formula IIb wherein:
$R^3$, $R^4$, $R^5$ and $R^6$ are each independently an alkyl group having 1-3 carbon atoms;
$R^7$ is $-O-C(=O)-R^9$;
L is $-O-C(=O)-R^{10}-C(=O)O-$;
R is either directly linked to the nitrogen atom ($-R^8$) or connected via an oxygen atom ($-OR^8$);
$R^8$ is an optionally substituted, optionally branched alkyl group having between 2 and 10 carbon atoms;
$R^9$ is an alkyl group having between 4 and 14 carbon atoms; and
$R^{10}$ is an alkyl group having between 4 and 14 carbon atoms.

2. The polymer composition according to claim 1, wherein the polypropylene is a heterophasic propylene copolymer consisting of a propylene-based matrix and a dispersed ethylene-α-olefin copolymer.

3. The polymer composition according to claim 2, wherein the heterophasic copolymer comprises between 70 and 90 wt. % of said matrix and between 10 and 30 wt. % of said dispersed ethylene-α-olefin copolymer.

4. The polymer composition according to claim 1, wherein $Q^1$ and $Q^2$ are each —$CH_2CH_2$—; $R^1$ and $R^2$ each —$C_{18}H_{37}$.

5. The polymer composition according to claim 1, wherein the inorganic acid scavenger is a hydrotalcite.

6. The polymer composition according to claim 1, wherein the composition further comprises a sterically hindered phenolic antioxidant.

7. The polymer composition according to claim 1, wherein the composition further comprises a phosphite antioxidant.

8. The polymer composition according to claim 1, wherein the thioether compound is present in an amount of between 0.10 and 1.0 wt. %, of the total polymer composition.

9. The polymer composition according to claim 1, wherein the Hindered Amine Light Stabilizer is present in an amount of between 0.05 and 0.75 wt. %, of the total polymer composition.

10. The polymer composition according to claim 1, wherein the inorganic acid scavenger compound is present in an amount of between 0.05 and 0.75 wt. %, of the total polymer composition.

11. The polymer composition according to claim 1, wherein the composition further comprises short glass fibre.

12. Article comprising the polymer composition of claim 1.

13. The article according to claim 12, wherein the article is a housing for antennas for wireless communication.

14. The polymer composition according to claim 1, wherein the composition further comprises a polyphenolic antioxidant.

15. The polymer composition according to claim 14, wherein the polyphenolic antioxidant is pentaerythritol tetrakis(3-(3,5-di-tert-butyl-4-hydroxyphenyl)propionate).

16. The polymer composition according to claim 11, wherein the short glass fibre is present in an amount of 5 and 50 wt. % of the total polymer composition.

17. The polymer composition according to claim 11, wherein the short glass fibre is present in an amount of 25 and 35 wt. %, of the total polymer composition.

18. A polymer composition, comprising a polypropylene and a stabilizing additive mixture, wherein said stabilizing additive mixture comprises:
i) a thioether compound according to Formula I:

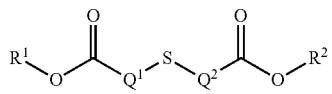

Formula I wherein $Q^1$ and $Q^2$ are each independently an alkyl spacer having between 1 and 6 carbon atoms; $R^1$ and $R^2$ each independently being an alkyl group having between 14 and 26 carbon atoms; O being oxygen and S being sulphur;
ii) a Hindered Amine Light Stabilizer comprising a substituted amine group; and
iii) an inorganic acid scavenger,
wherein the composition further comprises short glass fibre.

19. The polymer composition according to claim 18, wherein the substituted amine group in the HALS is a —N(R)— group or —N(—OR)— group; wherein R is a hydrocarbyl group.

20. The polymer composition according to claim 19, wherein the Hindered Amine Light Stabilizer has a structure represented by Formula IIa or IIb

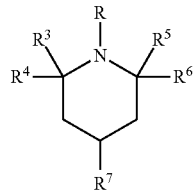

Formula IIa

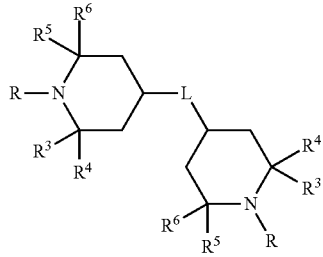

Formula IIb wherein:
$R^3$, $R^4$, $R^5$ and $R^6$ are each independently an alkyl group having 1-3 carbon atoms;
$R^7$ is —O—C(=O)—$R^9$;
L is —O—C(=O)—$R^{10}$—C(=O)O—;
R is either directly linked to the nitrogen atom (—$R^8$) or connected via an oxygen atom (—$OR^8$);
$R^8$ is an optionally substituted, optionally branched alkyl group having between 2 and 10 carbon atoms;
$R^9$ is an alkyl group having between 4 and 14 carbon atoms; and
$R^{10}$ is an alkyl group having between 4 and 14 carbon atoms.

21. The polymer composition according to claim 20, wherein $R^3$, $R^4$, $R^5$ and $R^6$ are each methyl; and $R^8$ is a branched alcohol group.

* * * * *